(12) United States Patent
Telford

(10) Patent No.: US 6,708,928 B2
(45) Date of Patent: Mar. 23, 2004

(54) VARIABLE SPACER FOR A SEPARATION SYSTEM OF A LAUNCH VEHICLE

(75) Inventor: Kenneth N. Telford, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 10/060,439

(22) Filed: Jan. 30, 2002

(65) Prior Publication Data

US 2003/0141416 A1 Jul. 31, 2003

(51) Int. Cl.⁷ ................................................. B64G 1/22
(52) U.S. Cl. ................................... 244/158 R; 244/161
(58) Field of Search ......................... 244/158 R, 161; 102/370; 29/446; 411/82.5

(56) References Cited

U.S. PATENT DOCUMENTS

| | | | | |
|---|---|---|---|---|
| 4,301,136 A | * | 11/1981 | Yamamoto et al. | 423/447.8 |
| 4,625,619 A | * | 12/1986 | Ceniza | 89/1.57 |
| 4,671,715 A | * | 6/1987 | Berg | 411/8 |
| 5,030,016 A | * | 7/1991 | Schoeffter | 384/448 |
| 5,226,617 A | * | 7/1993 | Panin | 244/158 R |
| 5,552,197 A | * | 9/1996 | Bettinger | 428/34.9 |
| 5,722,709 A | * | 3/1998 | Lortz et al. | 294/86.4 |
| 5,884,866 A | * | 3/1999 | Steinmeyer et al. | 244/137.1 |
| 6,126,371 A | * | 10/2000 | McCloskey | 411/82.5 |
| 6,343,770 B2 | * | 2/2002 | Holemans | 244/158 R |

FOREIGN PATENT DOCUMENTS

FR       0628478 A1 * 12/1994    .................. 244/161

* cited by examiner

Primary Examiner—Michael J. Carone
Assistant Examiner—Timothy D. Collins
(74) Attorney, Agent, or Firm—Terje Gudmestad

(57) ABSTRACT

A variable spacer includes a plate having a first surface and a second surface. At least one hole is integrally formed within the plate, extending from the first surface to the second surface. The hole receives a shaft of a separation bolt used for attaching a spacecraft to a launch vehicle. The plate increases a first load within the separation bolt to a second load during a turbulent stage. The second load reduces a gapping that occurs between the launch vehicle and the spacecraft. Thereafter, the plate reduces the second load within the separation bolt to a third load during a separation stage. The third load decreases a shock level experienced by the spacecraft and the launch vehicle.

17 Claims, 2 Drawing Sheets

VARIABLE SPACER FOR A SEPARATION SYSTEM OF A LAUNCH VEHICLE

TECHNICAL FIELD

The present invention relates generally to separation systems for launch vehicles, and more particularly, to variable spacers for use in such systems.

BACKGROUND OF THE INVENTION

Separation systems are typically integrated in launch vehicles for use during both spacecraft separation and fairing separation. As is widely known, launch vehicles are used to transport spacecrafts from the Earth's surface into space. Separation systems are typically used to secure the spacecrafts to the launch vehicles during lift-off and ascent. These systems then subsequently detach the spacecrafts from the launch vehicles during spacecraft separation. The separation systems may also be used to secure the fairings of the launch vehicles and then subsequently detach the fairings from each other during fairing separation.

Separation systems use separation bolts and fragmentary separator nuts to attach the spacecrafts to the payload attach fittings of the launch vehicles. A single spacecraft is typically attached to a payload attach fitting by employing a nut and bolt on one side of the spacecraft, with a nut and bolt being located at each corner of that side.

Torque is typically applied to the bolt or the nut to preload a separation bolt. Where a conventional bolt is used, the amount of preload is determined by merely specifying the amount of torque applied. Alternatively, where an instrumented bolt is used, the amount of preload is determined by measuring the strain output.

The separation bolts are typically preloaded so as to prevent an occurrence of gapping between mating surfaces of the spacecraft and the payload attach fitting. Gapping can be caused by acceleration forces experienced by the spacecraft primarily during lift-off and ascent. Gapping results in slight movement of the spacecraft with respect to the launch vehicle. This movement may exacerbate vibrations typically experienced by the spacecraft during liftoff and ascent. To prevent gapping and its adverse effects, a sufficient amount of preload is applied to the bolts. A typical amount of preload must exceed forces in the separation bolt caused by maximum accelerations experienced by the spacecraft.

Unfortunately, existing separation bolts remain preloaded during spacecraft separation and fairing separation. Spacecraft separation and fairing separation occur well beyond the time period usually necessary to prevent gapping. As is known, spacecraft separation occurs when the launch vehicle reaches a destination in space where the spacecraft is released. For example, spacecraft separation for a satellite usually occurs at the location where the launch vehicle reaches the desired orbit level of the satellite. During spacecraft separation, the separation system typically uses an ordinance device to force the fragmentary separator nut into three pieces thereby releasing the separation bolt and the spacecraft.

Likewise, fairing separation typically occurs when the launch vehicle is outside the atmosphere. During fairing separation, an ordinance device typically forces the fragmentary separator nut into three separate pieces thereby releasing the fairing.

Forcing the fragmentary separator nut into pieces suddenly releases the preloaded energy stored within the bolt. This abrupt release of energy may result in unacceptable levels of shock that can cause damage to the launch vehicle and the spacecraft. Such a result is obviously undesirable.

Therefore, a need exists to secure a spacecraft to a launch vehicle so as to prevent gapping during a turbulent stage while avoiding unacceptable shock levels during spacecraft separation.

SUMMARY OF THE INVENTION

It is therefore an object of the present invention to prevent an occurrence of gapping between mating surfaces of a spacecraft and a launch vehicle during periods of high dynamic loading on the spacecraft. Another object of the present invention is to reduce shock levels experienced during spacecraft separation. It is yet another object of the present invention to prevent an occurrence of gapping between mating surfaces of a fairing and a launch vehicle during periods of high dynamic loading on the launch vehicle. It is still another object of the present invention to reduce shock levels experienced during fairing separation.

In accordance with the above and other objects of the present invention, a variable spacer has been provided. The variable spacer includes a plate having a first surface and a second surface. The plate has at least one hole integrally formed therein, extending from the first surface to the second surface. The hole receives a separation bolt therein for attaching a first wall to a second wall. Torque is applied to the separation bolt for providing a first load therein. Then, the variable spacer is used to increase the first load to a second load during a turbulent stage. The second load prevents an occurrence of gapping at an attachment point between the first wall and the second wall during periods of high dynamic loading. The plate also reduces the second load to a third load during a separation stage. The third load decreases a shock level experienced by the launch vehicle and the payload transported by the launch vehicle.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

For a more complete understanding of the present invention, reference should now be had to the embodiments illustrated in greater detail in the accompanying drawings and described below by way of examples of the invention. In the drawings.

BEST MODES FOR CARRYING OUT THE INVENTION

Figure 1:
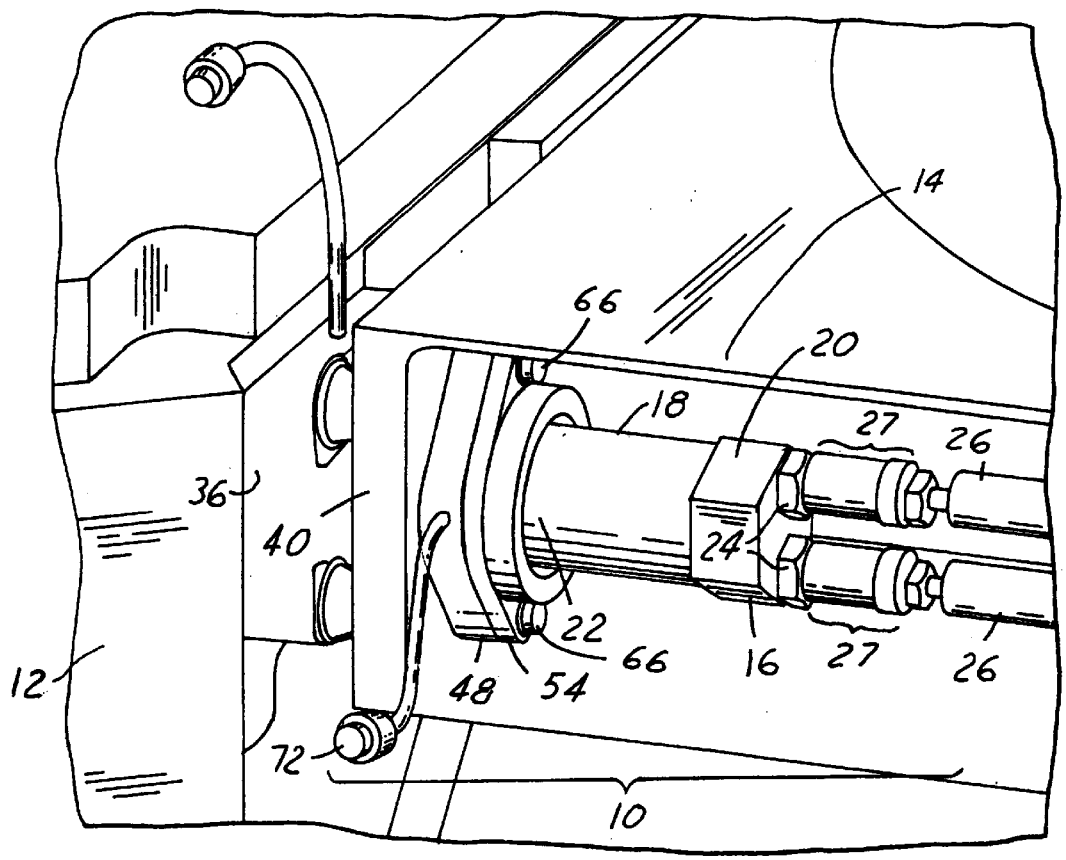
FIG. 1 is a perspective view of a separation system for securing a spacecraft to a payload attach fitting of a launch vehicle according to a preferred embodiment of the present invention.

In the following figures, the same reference numerals are used to identify the same components in the various views.

Referring now to FIG. 1, there is generally illustrated a perspective view of a separation system 10 for attaching a spacecraft 12 to a payload attach fitting 14 of a launch vehicle according to the present invention. Of course, one skilled in the art would understand that the separation system 10 may also be used for attaching a fairing to a launch vehicle or other uses as may be understood by one skilled in the art.

The separation system 10 includes a separator nut assembly 16. As shown in FIG. 1, the separator nut assembly 16 may be disposed within the payload attach fitting 14 of the launch vehicle. Typically, a single spacecraft is attached to a payload attach fitting 14 by employing a separator nut assembly 16 on one side of the spacecraft 12 and at each corner of that side. Of course, the separator assembly 16 may be used in a variety of other locations.

The separator nut assembly 16 includes a housing 18 having a first end 20 and a second end 22. The first end 20 has at least one aperture 24 formed therein for receiving at least one ordinance line 26. The ordinance line 26 connects to an ordinance device 27, which is used to force a fragmentary separator nut 68 into separate pieces. Typically, the separation system 10 employs two ordinance lines 26 and two ordinance devices 27 for each separator nut 68. The separator nut 68 is usually contained within the second end 22 of the housing 18.

Figure 2:
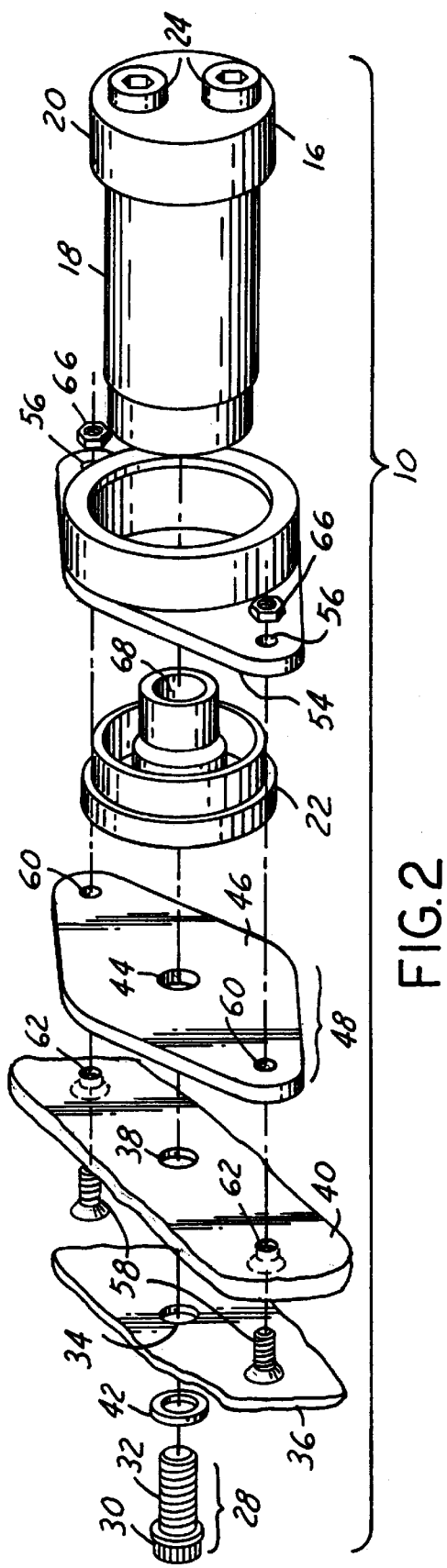
FIG. 2 is an exploded perspective view of a separation system according to a preferred embodiment of the present intention.

The remaining components of the separation system are best represented by the exploded perspective view illustrated in FIG. 2.

Referring now to FIG. 2, an exploded perspective view of the separation system 10 is represented according to a preferred embodiment of the present invention. In addition to the components mentioned in the description for FIG. 1, the separation system 10 also includes a separation bolt 28. The separation bolt 28 has a head 30 with a shaft 32 extending therefrom. Preferably, the bolt 28 is an instrumented bolt so as to permit a measurement of strain output of the bolt 28 and allow for an accurate preloading of the bolt 28. The bolt 28 may be substituted with various other types of fasteners as desired.

The shaft 32 of the bolt 28 is disposed within a first hole 34 of a first wall 36 and a second hole 38 of a second wall 40. For example, the first wall 36 may be an anchor plate of a disk assembly integrated within the spacecraft 12. Moreover, the second wall 40 may be a mounting bracket integrated within a payload attach fitting 14 of the launch vehicle. In an alternative embodiment of the invention, a converse arrangement of the walls 36, 40 may be employed. For example, the first wall 36 may be the mounting bracket of the payload attach fitting 14, and the second wall 40 may be the anchor plate of the spacecraft 12.

The head 30 of the bolt 28 is typically mated to a washer 42 which is then mated to the first wall 36. The shaft 32 extends from the head 30 of the bolt 28 through the first hole 34 of the first wall 36 and then through the second hole 38 of the second wall 40.

Thereafter, the shaft 32 extends through a channel 44 integrally formed within a plate 46 of a variable spacer 48. The channel 44 itself extends from a first surface 50 of the plate 46 to a second surface 52 of the plate 46. The variable spacer 48 is discussed in more detail in the descriptions for FIGS. 3A, 3B, 3C, and 3D.

The separation system 10 also includes a flange 54 for securing the variable spacer 48 to the second wall 40. The flange 54 has at least one flange hole 56 integrally formed therein for receiving a spacer bolt 58. Each flange hole 56 is typically aligned with a spacer hole 60 integrally formed within the variable spacer 48. Further, each spacer hole 60 is aligned with a wall hole 62 integrally formed within the second wall 40. The wall hole 62 typically includes a countersink 64 so as to receive the head of the spacer bolt 58. Each spacer bolt 58 extends through its corresponding wall hole 62, spacer hole 60 and flange hole 56. A spacer nut 66 engages the spacer bolt 58 so as to secure the variable spacer 48 to the second wall 40.

A fragmentary separator nut 68 is typically coupled to the shaft 32 so as to tightly engage the first wall 36, the second wall 40, and the variable spacer 48 to each other. The nut 68 is typically coupled to the shaft 32 of the separation bolt 28 by a threaded engagement. The engagement between the nut 68 and the separation bolt 28 secures the first wall 36 and its corresponding body to the second wall 40 and its corresponding body. For example, the engagement between the bolt 28 and the nut 68 may secure a spacecraft 12 to a launch vehicle. Further, the engagement between the bolt 28 and the nut 68 may also secure a fairing to a launch vehicle.

Figure 3D:
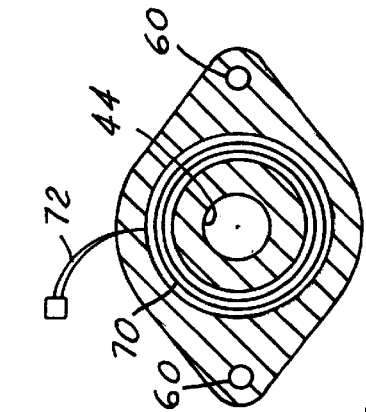
FIG. 3D is a cross-sectional view of the variable spacer taken along line B—B of FIG. 3B.
Figure 3C:
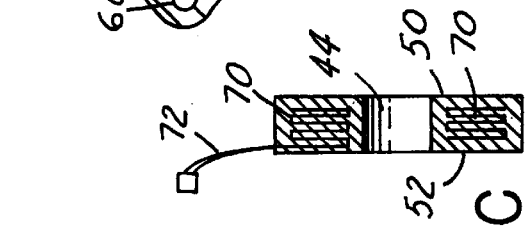
FIG. 3C is a cross-sectional view of the variable spacer taken along line A—A of FIG. 3A.
Figure 3B:
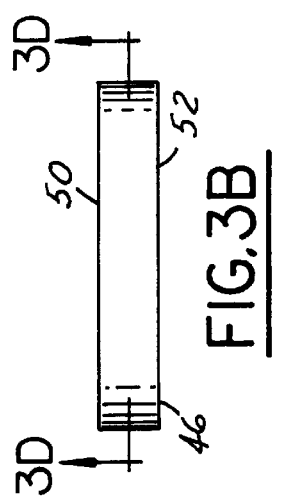
FIG. 3B is a side view of a variable spacer according to a preferred embodiment of the present invention.
Figure 3A:
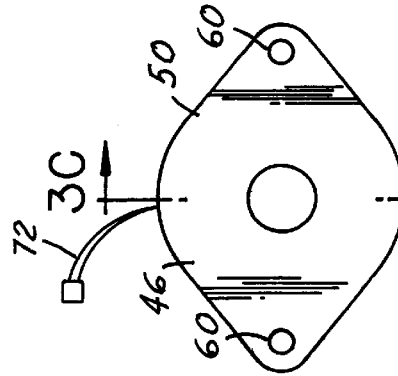
FIG. 3A is an axial view of a variable spacer according to a preferred embodiment of the present invention.

Referring now to FIGS. 3A, 3B, 3C, and 3D, a variable spacer 48 is illustrated in various views according to a preferred embodiment of the present invention. FIG. 3A is an axial view of the variable spacer 48. As mentioned in the description for FIG. 2, the variable spacer 48 has a channel 44 integrally formed therein for receiving the shaft 32 of a separation bolt 28. Furthermore, the variable spacer 48 also includes at least one spacer hole 60 integrally formed therein. Each spacer hole 60 receives a spacer bolt 58 that operatively couples the variable spacer 48 to the second wall 40.

FIG. 3B illustrates a side view of the variable spacer 48 shown in FIG. 3A. The variable spacer 48 includes a plate 46 having a first surface 50 and a second surface 52. Typically, the first surface 50 of the plate 46 is operatively mated to the second wall 40 by at least one spacer bolt 58.

The second surface 52 of the plate 46 is typically mated to the fragmentary separator nut 68 and the flange 54. As detailed in the description for FIG. 2, the flange 54 and spacer bolt 58 operatively couple the variable spacer 48 to the second wall 40. Further, the fragmentary separator nut 68 and the separation bolt 28 operatively couple the first wall 36 and its accompanying body to the second wall 40 and its accompanying body through the variable spacer 48.

Referring now to FIGS. 3C and 3D, there are illustrated cross-sectional views of the variable spacer 48 shown in FIGS. 3A and 3B, taken along lines A—A and B—B, respectively. The plate 46 is preferably composed of a material having a desired coefficient of thermal expansion in a thickness direction for permitting the spacer 48 to increase and decrease in thickness according to its temperature. The change in thickness of the variable spacer 48 changes the amount of load experienced by the separation bolt 28. For example, a variable spacer 48 is tightly engaged between a nut 68 and the head 30 of a bolt 28 by a first load. The first load is simply provided by a torque applied to the bolt 28. As the temperature increases, the spacer 48 tends to grow in thickness thereby exerting a force on the nut 68 and the head 30. Thus, the increase in temperature and the resulting growth of the spacer 48 increases the first load to a second load on the shaft 32 of the bolt 28. Likewise, as the temperature decreases, the spacer 48 tends to shrink in thickness thereby reducing the second load within the shaft 32 of the bolt 28 to a third load.

In a preferred embodiment, the plate 46 of the variable spacer 48 is composed of a fiberglass reinforced epoxy composite laminate. The epoxy resin typically has a coefficient of thermal expansion approximately equal to $30 \times 10^{-6}$ in/° F. Layers of fiberglass cloth contain the epoxy resin and insulate the resin once it has been heated. Preferably, three layers of fiberglass laminates are bonded together to form the plate 46. Alternatively, resin for the variable spacer may be composed of a cyanate ester. Cyanate ester has a coefficient of thermal expansion approximately equal to $45 \times 10^{-6}$ in/° F. Of course, other forms of material may be used for providing a material with a high coefficient of thermal expansion in the thickness direction.

As shown in FIGS. 3C and 3D, the variable spacer 48 preferably includes a heating element 70 integrally formed therein. The heating element 70 preferably is a graphite tow having a plurality of graphite fibers therein. A typical graphite tow has thousands of fibers therein. The graphite tow has an electrical resistance dependent upon a modulus of the graphite fibers and a quantity of the fibers therein. Preferably, the heating element is a 12K tow having a standard modulus graphite and a length of 12 inches. A standard modulus of the dry graphite fiber typically is 33,000,000 pounds per square inch (psi). The graphite tow is typically disposed in a groove integrally formed within a middle fiberglass laminate. The tow has a power cord connected thereto for receiving an electrical current. The groove is then filled with resin. Thereafter, additional fiberglass laminates are bonded on both sides of the middle fiberglass laminate so as to place the tow in the center of the plate 46. Of course, the heating element 70 may be another mechanism as desired.

The fiberglass laminates may electrically and thermally insulate the coil. For example, the fiberglass composite may prevent a short circuit of the resistive electrical coil and more effectively preserve an elevated temperature of the epoxy resin.

The heating element 70 is typically provided with an external power supply through an electrical cord 70 extending from the plate 46. As mentioned above, the heating element 70 preferably is a length of a highly resistive graphite tow. The tow receives an electrical current from the electrical cord 70. Consequently, the temperature of the tow increases thereby raising the temperature of the plate 46.

The variable spacer 48 has a desired compression strength and a desired stiffness through the thickness of the spacer 48. A typical desired compression strength through the thickness is at least 25,000 psi. Further, a typical desired compression modulus is at least 800,000 psi. Of course, these parameters may vary as desired.

Figure 4:
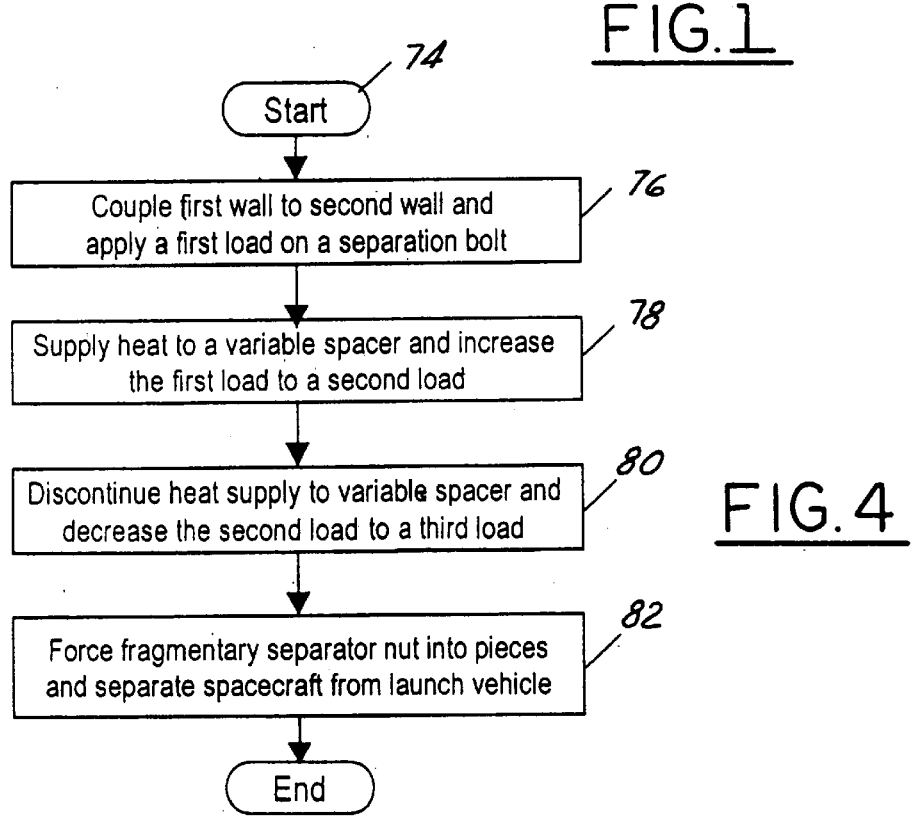
FIG. 4 is a flow chart depicting a method for securing a spacecraft to a payload attach fitting of a launch vehicle according to a preferred embodiment of the invention.

Referring to FIG. 4, a flowchart illustrating a method for securing a spacecraft to a launch vehicle according to the present invention is shown. Of course, the same method may be used to secure the fairing to the launch vehicle.

In operation, the method of the present invention is initiated at step 74 and then immediately proceeds to step 76. In step 76, a separation bolt 28 is used to connect a first wall 36 to a second wall 40 by applying torque to at least one of a fragmentary separator nut 68 and a head 30 of a bolt 28. As a result, a first load is applied to a shaft 32 of the bolt 28. Then, the sequence proceeds to step 78.

In step 78, the separation system 10 is provided as detailed in the descriptions for FIGS. 2, 3A, 3B, 3C, and 3D. Further, power is supplied to the heating element 70 integrated within the plate 46 of the variable spacer 48. For example, the electrical cord 72 of the spacer 48 is connected to an external electrical power source. As the temperature of the heating element 70 rises, the temperature of the plate 46 rises. As is known in the art, an increase in temperature of the plate 46 results in an increase in the thickness of the plate 46 because of the substantially large coefficient of thermal expansion of the plate 46 in the thickness direction. The plate 46 is preferably heated for at least two hours so as to permit the plate 46 to reach a maximum growth in thickness. The resultant growth in thickness increases the first load on the shaft 32 of the bolt 28 to a second load.

The second load preferably is greater than the maximum accelerations the spacecraft 12 may experience during the turbulent stage. Typically, the second load is twice the magnitude of the first load but may be otherwise as desired. Further, the second load within the bolt 28 prevents gapping from occurring between the spacecraft 12 and the launch vehicle. For example, the second load, as applied to one of four separation bolts attaching a 3000 lb spacecraft to a launch vehicle, may be at least 7000 lb. Then, the sequence proceeds to step 80.

In step 80, the power supply provided to the heating element 70 is discontinued. Typically, the power supply is discontinued at lift-off of the launch vehicle. Without an electric current being supplied to the heating element 70 integrated within the variable spacer 48, heat is no longer being supplied to the plate 46. As a result, the plate 46 begins to gradually cool down.

The cooling rate of the spacer 48 is sufficiently low so as to preserve the increased thickness of the plate 46 and the accompanying load on the bolt 28 during a turbulent stage experienced by the launch vehicle. During the turbulent stage, the spacecraft 12 and the launch vehicle experience substantial dynamic loading that may cause gapping between the launch vehicle and the spacecraft 12 at the attachment point. The turbulent stage typically includes at least one time period of lift-off, ascent occurring immediately after lift-off, and main-engine cut-off. The second load, as applied to the separation bolt 28, is sufficient to prevent gapping between the spacecraft 12 and the launch vehicle at the attachment point.

By the time the launch vehicle has reached a location for the separation stage to begin, the plate 46 has cooled sufficiently thereby shrunken in thickness. As one skilled in the art would understand, decreasing the temperature of a material having a high coefficient of thermal expansion subsequently causes the material to decrease in size. Thus, the plate having a substantially large coefficient of thermal expansion in the thickness direction shrinks in thickness as it gradually cools after the power supply to the heating element has been discontinued. Preferably, the variable spacer 48 is cooled by merely detaching the external power supply from the electrical cord 70 of the variable spacer 48 at liftoff. The reduction in thickness of the plate 46 consequently reduces the second load to a third load. The reduction in load within the shaft 32 of the bolt 28 reduces shock levels that would have been produced during spacecraft separation if the second load had remained within the bolt 28. Typically, the third load is half the magnitude of the second load but may be otherwise as desired. The sequence then proceeds to step 82.

In step 82, a separation occurs whereby the fragmentary separator nut 68 is forced into separate pieces thereby releasing the separation bolt 28. Typically, an ordinance device 27 forces the nut 68 into fragments. Thereafter, a biasing member forces the spacecraft 12 away from the launch vehicle. Typically, a spring (not shown) operatively coupled to the separator nut assembly 16 pushes the spacecraft 12 away from the launch vehicle for spacecraft separation. Alternatively, the spring may push the fairing away from the launch vehicle for fairing separation. Evidently, the separation stage may include at least one of spacecraft separation and fairing separation.

The third load within the separation bolt 28 preferably is sufficiently low to reduce shock levels experienced during the separation stage. Conventional spacecraft separation results in the sudden release of any remaining energy loaded within the bolt 28. Therefore, the reduction of the second load to the third load within the bolt 28 reduces the shock levels experienced as the separation bolt 28 is released. Thus, the third load preferably has half the magnitude of the second load.

While particular embodiments of the present invention have been shown and described, numerous variations and alternate embodiments will occur to those skilled in the art. Accordingly, it is intended that the invention be limited only in terms of the appended claims.

What is claimed is:

1. A variable spacer for a separation system of a launch vehicle, the variable spacer comprising:

a laminate plate comprised of a plurality of fiber layers that are bonded together by a resin material, said plurality of fiber layers intended to strengthen said laminate plate, said laminate plate having a first surface and a second surface, said laminate plate having a hole integrally formed therein and extending from said first surface to said second surface, said hole being intended to receive a bolt therethrough for attaching a first wall to a second wall, said resin material having a desired thermal expansion coefficient for causing said laminate plate to substantially change in thickness so as to regulate a preload within said bolt, said laminate plate having a first thickness, said laminate plate having a second thickness when said laminate plate is compressed for attaching said first wall to said second wall, said laminate plate having a third thickness when a plate temperature of said laminate plate is raised to an elevated temperature, said laminate plate having a fourth thickness when said plate temperature of said laminate plate is reduced to a lowered temperature; and a heating element integrally formed within said laminate plate and intended to heat said resin material.

2. The variable spacer as recited in claim 1 wherein said heating element is a graphite tow.

3. The variable spacer as recited in claim 1 wherein a power cord is coupled to said heating element for supplying an electrical current thereto.

4. The variable spacer as recited in claim 1 wherein said plate temperature is raised to said elevated temperature during a turbulent stage, said turbulent stage occurring during at least one of the following events: a launch vehicle lift-off, a launch vehicle ascent, and a main engine cut-off.

5. The variable spacer as recited in claim 1 wherein said plate temperature is reduced to said lowered temperature during a separation stage, said separation stage occurring during at least one of a spacecraft separation and a fairing separation.

6. A fastener assembly comprising:

a bolt having a head, said head having a shaft extending therefrom, said shaft disposed within a first hole of a first wall and a second bole of a second wall;

a nut coupled to said shaft of said bolt, said first wall and said second wall being disposed between said nut and said head;

a variable spacer operatively coupled to said bolt and applying a preload thereto, said variable spacer being a laminate plate comprised of a plurality of fiber layers that are bonded together by a resin material, said plurality of fiber layers intended to strengthen said laminate plate, said resin material having a desired thermal expansion coefficient for causing said laminate plate to substantially change in thickness so as to regulate said preload within said bolt, said laminate plate having a first thickness, said laminate plate having a second thickness when said laminate plate is compressed for attaching said first wall to said second wall, said laminate plate having a third thickness when a plate temperature of said laminate plate is raised to an elevated temperature, said laminate plate having a fourth thickness when said plate temperature of said laminate plate is reduced to a lowered temperature; and a heating element integrally formed within said laminate plate and intended to heat said resin material.

7. The fastener assembly as recited in claim 6 wherein said heating element is a graphite tow.

8. The fastener assembly as recited in claim 6 wherein a power cord is coupled to said heating element for applying an electrical current thereto.

9. The fastener assembly as recited in claim 6 wherein said plate temperature is raised to said elevated temperature during a turbulent stage, said turbulent stage occurring during at least one of the following events: a launch vehicle lift-off, a launch vehicle ascent, and a main engine cut-off.

10. The fastener assembly as recited in claim 6 wherein said plate temperature is reduced to said lowered temperature during a separation stage, said separation stage occurring during at least one of a spacecraft separation and a fairing separation.

11. The fastener assembly as recited in claim 6 further comprising:

a housing enclosing said nut, said housing having a first end and a second end, said first end having an opening formed therein for receiving said shaft of said bolt, said second end having an aperture formed therein;

an ordinance device extending through said aperture of said second end, said ordinance device extending from an actuator to said nut, said ordinance device removing said nut from said bolt at a separation stage; and a biasing member contained within said housing, said biasing member biasing said first wall away from said second wall.

12. A method for attaching a spacecraft to a launch vehicle, the method comprising:

forming a laminate plate having a resin material impregnated therein, said resin material having a desired thermal expansion coefficient for causing said laminate plate to substantially change in thickness so as to regulate a preload within a bolt fastener;

sandwiching said laminate plate between a first wall and a second wail;

applying a first load on a bolt for coupling the spacecraft to the launch vehicle;

increasing said first load to a second load during a turbulent stage; and decreasing said second load to a third load during a separation stage.

13. The method of claim 12 wherein forming a laminate plate comprises:
   stacking a plurality of fiber layers of composite laminate material;
   forming a channel in one of said plurality of fiber layers of composite laminate material;
   placing a heating element within said channel; and
   bonding said plurality of fiber layers together with said resin material.

14. The method of claim 11 wherein increasing a first load to a second load comprises:
   heating said resin material of said laminate plate to a predetermined elevated temperature.

15. The method of claim 11 wherein decreasing a second load to a third load comprises:
   cooling said resin materiel of said laminate plate to a predetermined decreased temperature.

16. The variable spacer of claim 1 wherein said desired thermal expansion coefficient is selected from the range substantially between $30 \times 10^{-6}$ in/F and $45 \times 10^{-6}$ in/F.

17. The fastener assembly of claim 6 wherein said desired thermal expansion coefficient is selected from the range substantially between $30 \times 10^{-6}$ in/F and $45 \times 10^{-6}$ in/F.

* * * * *